(12) United States Patent
Ross et al.

(10) Patent No.: US 10,075,681 B2
(45) Date of Patent: Sep. 11, 2018

(54) DUAL LENS CAMERA UNIT

(71) Applicant: Digital Ally, Inc., Lenexa, KS (US)

(72) Inventors: Stanton E. Ross, Overland Park, KS (US); Peng Han, Overland Park, KS (US)

(73) Assignee: Digital Ally, Inc., Lenexa, KS (US)

( * ) Notice: Subject to any disclaimer, the term of this patent is extended or adjusted under 35 U.S.C. 154(b) by 0 days.

(21) Appl. No.: 14/517,226

(22) Filed: Oct. 17, 2014

(65) Prior Publication Data

US 2015/0063776 A1   Mar. 5, 2015

Related U.S. Application Data

(63) Continuation-in-part of application No. 13/967,151, filed on Aug. 14, 2013.

(51) Int. Cl.
*H04N 5/77* (2006.01)
*H04N 7/18* (2006.01)
(Continued)

(52) U.S. Cl.
CPC .......... *H04N 7/188* (2013.01); *G11B 15/026* (2013.01); *H04N 5/76* (2013.01); *H04N 5/772* (2013.01);
(Continued)

(58) Field of Classification Search
USPC .................. 386/223–224, 239–248, 228–229
See application file for complete search history.

(56) References Cited

U.S. PATENT DOCUMENTS 4,409,670 A   10/1983   Herndon et al.
4,789,904 A   12/1988   Peterson
(Continued)

FOREIGN PATENT DOCUMENTS

DE   102010019451 A1   11/2011
EP        247993 A2    7/2012
(Continued)

OTHER PUBLICATIONS

Techdad Review (http://techdadreview.com/2013/06/19/atc-chameleon/, Jun. 19, 2013, 1 page.*
(Continued)

*Primary Examiner* — Hung Dang
(74) *Attorney, Agent, or Firm* — Erise IP, P.A.

(57) ABSTRACT

Embodiments of the invention relate to a portable digital video system sized to be worn on the user's body and equipped with a plurality of lens assemblies for recording video in a plurality of directions. In one embodiment, the invention includes a camera unit comprising a first lens assembly, a second lens assembly, a first housing containing the first lens assembly and the second lens assembly, a battery unit, a first storage memory, controller circuitry operable to receive video data from the first lens assembly and the second lens assembly and store the video data in the first storage memory, and a second housing containing the battery unit and attached via a cable to the first housing unit. In some embodiments, the system is equipped with both volatile and non-volatile memory for continuous recording with permanent storage of key video segments.

21 Claims, 5 Drawing Sheets

Figure 1:
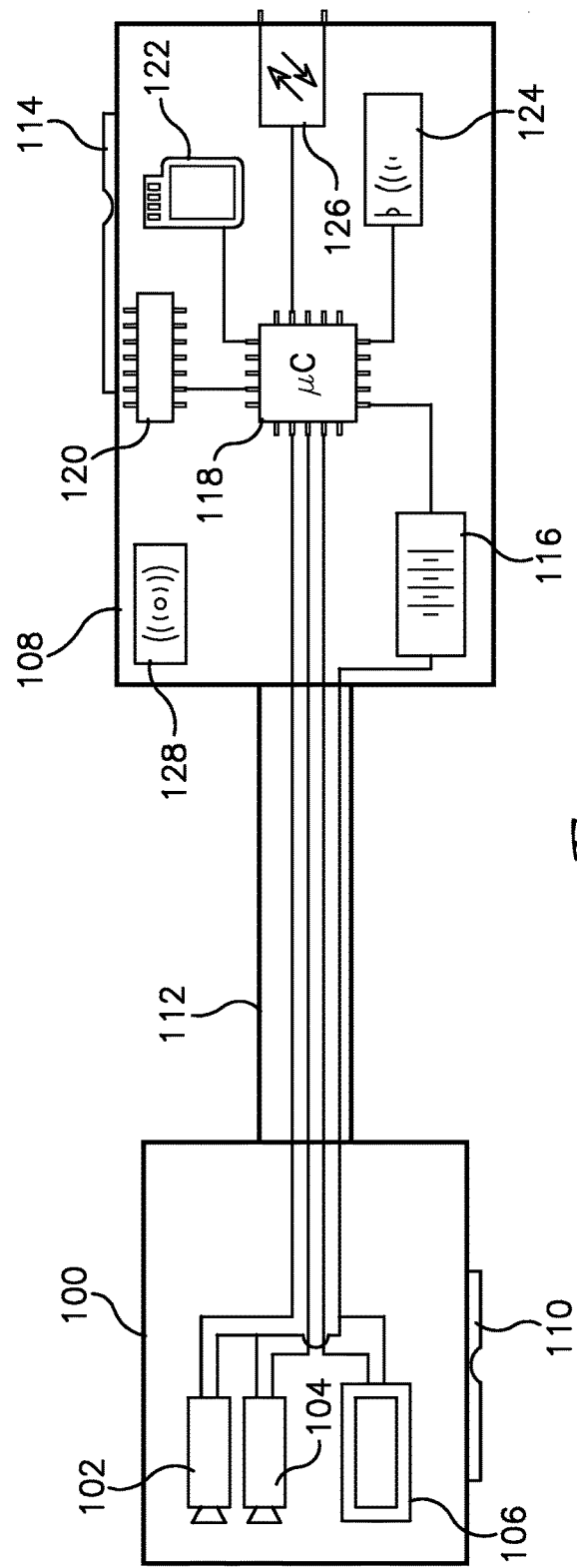

(51) Int. Cl.
  *G11B 15/02* (2006.01)
  *H04N 5/76* (2006.01)
  *H04N 5/765* (2006.01)
  *G08B 13/196* (2006.01)

(52) U.S. Cl.
  CPC ....... *H04N 7/181* (2013.01); *G08B 13/19645* (2013.01); *H04N 5/765* (2013.01)

(56) References Cited

U.S. PATENT DOCUMENTS

| | | |
|---|---|---|
| 4,863,130 A | 9/1989 | Marks, Jr. |
| 4,918,473 A | 4/1990 | Blackshear |
| 5,027,104 A | 6/1991 | Reid |
| 5,096,287 A | 3/1992 | Kaikinami et al. |
| 5,111,289 A | 5/1992 | Lucas et al. |
| 5,289,321 A | 2/1994 | Secor |
| 5,381,155 A | 1/1995 | Gerber |
| 5,408,330 A | 4/1995 | Squicciarini et al. |
| 5,446,659 A | 8/1995 | Yamawaki |
| 5,453,939 A | 9/1995 | Hoffman et al. |
| 5,473,729 A | 12/1995 | Bryant et al. |
| 5,479,149 A | 12/1995 | Pike |
| 5,497,419 A | 3/1996 | Hill |
| 5,526,133 A | 6/1996 | Paff |
| 5,585,798 A | 12/1996 | Yoshioka et al. |
| 5,642,285 A | 6/1997 | Woo et al. |
| 5,668,675 A | 9/1997 | Fredricks |
| 5,689,442 A | 11/1997 | Swanson et al. |
| 5,742,336 A | 4/1998 | Lee |
| 5,752,632 A | 5/1998 | Sanderson et al. |
| 5,798,458 A | 8/1998 | Monroe |
| 5,815,093 A | 9/1998 | Kikinis |
| 5,850,613 A | 12/1998 | Bullecks |
| 5,878,283 A | 3/1999 | House et al. |
| 5,886,739 A | 3/1999 | Winningstad |
| 5,890,079 A | 3/1999 | Levine |
| 5,926,210 A | 7/1999 | Hackett et al. |
| 5,962,806 A | 10/1999 | Coakley et al. |
| 5,978,017 A | 11/1999 | Tino |
| 5,983,161 A | 11/1999 | Lemelson et al. |
| 5,996,023 A | 11/1999 | Winter et al. |
| 6,008,841 A | 12/1999 | Charlson |
| 6,028,528 A | 2/2000 | Lorenzetti et al. |
| 6,052,068 A | 4/2000 | Price et al. |
| 6,097,429 A | 8/2000 | Seeley et al. |
| 6,100,806 A | 8/2000 | Gaukel |
| 6,121,881 A | 9/2000 | Bieback et al. |
| 6,141,609 A | 10/2000 | Herdeg et al. |
| 6,141,611 A | 10/2000 | Macket et al. |
| 6,163,338 A | 12/2000 | Johnson et al. |
| 6,175,300 B1 | 1/2001 | Kendrick |
| 6,298,290 B1 | 10/2001 | Abe et al. |
| 6,310,541 B1 | 10/2001 | Atkins |
| 6,314,364 B1 | 11/2001 | Nakamura |
| 6,324,053 B1 | 11/2001 | Kamijo |
| 6,326,900 B2 | 12/2001 | Deline et al. |
| 6,333,694 B2 | 12/2001 | Pierce et al. |
| 6,333,759 B1 | 12/2001 | Mazzilli |
| 6,370,475 B1 | 4/2002 | Breed et al. |
| RE37,709 E | 5/2002 | Dukek |
| 6,389,340 B1 | 5/2002 | Rayner |
| 6,396,403 B1 | 5/2002 | Haner |
| 6,405,112 B1 | 6/2002 | Rayner |
| 6,449,540 B1 | 9/2002 | Rayner |
| 6,452,572 B1 | 9/2002 | Fan et al. |
| 6,490,409 B1 | 12/2002 | Walker |
| 6,518,881 B2 | 2/2003 | Monroe |
| 6,525,672 B2 | 2/2003 | Chainer et al. |
| 6,546,119 B2 | 4/2003 | Ciolli et al. |
| 6,560,463 B1 | 5/2003 | Santhoff |
| 6,563,532 B1 | 5/2003 | Strub et al. |
| 6,591,242 B1 | 7/2003 | Karp et al. |
| 6,681,195 B1 | 1/2004 | Poland et al. |
| 6,690,268 B2 | 2/2004 | Schofield et al. |
| 6,697,103 B1 | 2/2004 | Fernandez et al. |
| 6,718,239 B2 | 4/2004 | Rayner |
| 6,727,816 B1 | 4/2004 | Helgeson |
| 6,748,792 B1 | 6/2004 | Freund et al. |
| 6,823,621 B2 | 11/2004 | Gotfried |
| 6,831,556 B1 | 12/2004 | Boykin |
| 6,856,873 B2 | 2/2005 | Breed et al. |
| 6,883,694 B2 | 4/2005 | Abelow |
| 6,950,122 B1 | 9/2005 | Mirabile |
| 6,970,183 B1 | 11/2005 | Monroe |
| 7,012,632 B2 | 3/2006 | Freeman et al. |
| 7,034,683 B2 | 4/2006 | Ghazarian |
| D520,738 S | 5/2006 | Tarantino |
| 7,038,590 B2 | 5/2006 | Hoffman et al. |
| 7,088,387 B1 | 8/2006 | Freeman et al. |
| D529,528 S | 10/2006 | Ross et al. |
| 7,119,832 B2 | 10/2006 | Blanco et al. |
| 7,126,472 B2 | 10/2006 | Kraus et al. |
| 7,147,155 B2 | 12/2006 | Weekes |
| 7,180,407 B1 | 2/2007 | Guo |
| 7,190,882 B2 | 3/2007 | Gammenthaler |
| 7,363,742 B2 | 4/2008 | Nerheim |
| 7,371,021 B2 | 5/2008 | Ross, Jr. et al. |
| 7,421,024 B2 | 9/2008 | Castillo |
| 7,436,143 B2 | 10/2008 | Lakshmanan et al. |
| 7,436,955 B2 | 10/2008 | Yan et al. |
| 7,448,996 B2 | 11/2008 | Khanuja et al. |
| 7,456,875 B2 | 11/2008 | Kashiwa |
| 7,496,140 B2 | 2/2009 | Winningstad et al. |
| 7,500,794 B1 | 3/2009 | Clark |
| 7,508,941 B1 | 3/2009 | O'Toole, Jr. et al. |
| 7,511,737 B2 | 3/2009 | Singh |
| 7,536,457 B2 | 5/2009 | Miller |
| 7,539,533 B2 | 5/2009 | Tran |
| 7,561,037 B1 | 7/2009 | Monroe |
| 7,594,305 B2 | 9/2009 | Moore |
| 7,602,301 B1 | 10/2009 | Stirling et al. |
| 7,656,439 B1 | 2/2010 | Manico et al. |
| 7,659,827 B2 | 2/2010 | Gunderson et al. |
| 7,680,947 B2 | 3/2010 | Nicholl et al. |
| 7,697,035 B1 * | 4/2010 | Suber et al. ............. 348/211.99 |
| 7,804,426 B2 | 9/2010 | Etcheson |
| 7,806,525 B2 | 10/2010 | Howell et al. |
| 7,853,944 B2 | 12/2010 | Choe |
| 7,944,676 B2 | 5/2011 | Smith et al. |
| 8,077,029 B1 | 12/2011 | Daniel et al. |
| 8,121,306 B2 | 2/2012 | Cilia et al. |
| 8,175,314 B1 | 5/2012 | Webster |
| 8,179,604 B1 * | 5/2012 | Prada Gomez .... G02B 27/0093 345/8 |
| 8,269,617 B2 | 9/2012 | Cook et al. |
| 8,314,708 B2 | 11/2012 | Gunderson et al. |
| 8,356,438 B2 | 1/2013 | Brundula et al. |
| 8,373,567 B2 | 2/2013 | Denson |
| 8,384,539 B2 | 2/2013 | Denny et al. |
| 8,446,469 B2 | 5/2013 | Blanco et al. |
| 8,456,293 B1 | 6/2013 | Trundel et al. |
| 8,503,972 B2 | 8/2013 | Haler et al. |
| 8,508,353 B2 | 8/2013 | Cook et al. |
| 8,520,069 B2 | 8/2013 | Haler |
| 8,594,485 B2 | 11/2013 | Brundula |
| 8,606,492 B1 | 12/2013 | Botnen |
| 8,676,428 B2 | 3/2014 | Richardson et al. |
| 8,707,758 B2 | 4/2014 | Keays |
| 8,725,462 B2 | 5/2014 | Jain et al. |
| 8,744,642 B2 | 6/2014 | Nemat-Nasser et al. |
| 8,780,205 B2 | 7/2014 | Boutell et al. |
| 8,781,292 B1 | 7/2014 | Ross et al. |
| 8,805,431 B2 | 8/2014 | Vasavada et al. |
| 8,849,501 B2 | 9/2014 | Cook et al. |
| 8,854,199 B2 | 10/2014 | Cook et al. |
| 8,896,694 B2 | 11/2014 | O'Donnell et al. |
| 8,930,072 B1 | 1/2015 | Lambert et al. |
| 8,989,914 B1 | 3/2015 | Nemat-Nasser et al. |
| 8,996,234 B1 | 3/2015 | Tamari et al. |
| 9,003,474 B1 | 4/2015 | Smith |
| 9,058,499 B1 | 6/2015 | Smith |
| 9,122,082 B2 | 9/2015 | Abreau |
| 9,164,543 B2 | 10/2015 | Minn et al. |

(56) References Cited

U.S. PATENT DOCUMENTS

| | | | |
|---|---|---|---|
| 9,253,452 B2 | 2/2016 | Ross et al. | |
| 2002/0013517 A1 | 1/2002 | West et al. | |
| 2002/0019696 A1 | 2/2002 | Kruse | |
| 2002/0032510 A1 | 3/2002 | Tumball et al. | |
| 2002/0044065 A1 | 4/2002 | Quist et al. | |
| 2002/0049881 A1 | 4/2002 | Sugimura | |
| 2002/0084130 A1 | 7/2002 | Der Gazarian et al. | |
| 2002/0131768 A1 | 9/2002 | Gammenthaler | |
| 2002/0135336 A1 | 9/2002 | Zhou et al. | |
| 2002/0159434 A1 | 10/2002 | Gosior et al. | |
| 2002/0191952 A1* | 12/2002 | Fiore | H04N 5/76 386/217 |
| 2003/0040917 A1 | 2/2003 | Fiedler | |
| 2003/0080713 A1 | 5/2003 | Kirmuss | |
| 2003/0080878 A1 | 5/2003 | Kirmuss | |
| 2003/0081121 A1 | 5/2003 | Kirmuss | |
| 2003/0081934 A1 | 5/2003 | Kirmuss | |
| 2003/0081935 A1 | 5/2003 | Kirmuss | |
| 2003/0081942 A1 | 5/2003 | Melnyk et al. | |
| 2003/0095688 A1 | 5/2003 | Kirmuss | |
| 2003/0106917 A1 | 6/2003 | Shelter et al. | |
| 2003/0133018 A1 | 7/2003 | Ziemkowski | |
| 2003/0151510 A1 | 8/2003 | Smith | |
| 2003/0173408 A1 | 9/2003 | Mosher, Jr. et al. | |
| 2003/0184674 A1 | 10/2003 | Manico et al. | |
| 2003/0185417 A1 | 10/2003 | Alttar et al. | |
| 2003/0215010 A1 | 11/2003 | Kashiwa | |
| 2003/0215114 A1* | 11/2003 | Kyle | 382/115 |
| 2003/0222982 A1 | 12/2003 | Hamdan et al. | |
| 2004/0008255 A1 | 1/2004 | Lewellen | |
| 2004/0043765 A1 | 3/2004 | Tolhurst | |
| 2004/0143373 A1 | 6/2004 | Ennis | |
| 2004/0145457 A1 | 7/2004 | Schofield et al. | |
| 2004/0150717 A1 | 8/2004 | Page et al. | |
| 2004/0168002 A1 | 8/2004 | Accarie et al. | |
| 2004/0199785 A1 | 10/2004 | Pederson | |
| 2004/0223054 A1 | 11/2004 | Rotholtz | |
| 2004/0243734 A1 | 12/2004 | Kitagawa et al. | |
| 2004/0267419 A1 | 12/2004 | Jeng | |
| 2005/0030151 A1 | 2/2005 | Singh | |
| 2005/0035161 A1 | 2/2005 | Shioda | |
| 2005/0046583 A1 | 3/2005 | Richards | |
| 2005/0050266 A1 | 3/2005 | Haas et al. | |
| 2005/0068169 A1 | 3/2005 | Copley et al. | |
| 2005/0083404 A1 | 4/2005 | Pierce et al. | |
| 2005/0094966 A1 | 5/2005 | Elberbaum | |
| 2005/0100329 A1 | 5/2005 | Lao et al. | |
| 2005/0101334 A1 | 5/2005 | Brown et al. | |
| 2005/0134966 A1 | 5/2005 | Burgner | |
| 2005/0132200 A1 | 6/2005 | Jaffe et al. | |
| 2005/0151852 A1 | 7/2005 | Jomppanen | |
| 2005/0167172 A1 | 8/2005 | Fernandez | |
| 2005/0185438 A1 | 8/2005 | Ching | |
| 2005/0206532 A1 | 9/2005 | Lock | |
| 2005/0206741 A1 | 9/2005 | Raber | |
| 2005/0228234 A1 | 10/2005 | Yang | |
| 2005/0232469 A1 | 10/2005 | Schofield et al. | |
| 2005/0243171 A1 | 11/2005 | Ross, Sr. et al. | |
| 2006/0009238 A1 | 1/2006 | Stanco et al. | |
| 2006/0014563 A1* | 1/2006 | Cheng | H04M 1/0254 455/557 |
| 2006/0028811 A1 | 2/2006 | Ross, Jr. et al. | |
| 2006/0055786 A1 | 3/2006 | Olilla | |
| 2006/0158968 A1 | 7/2006 | Vanman et al. | |
| 2006/0164220 A1 | 7/2006 | Harter, Jr. et al. | |
| 2006/0164534 A1 | 7/2006 | Robinson et al. | |
| 2006/0170770 A1 | 8/2006 | MacCarthy | |
| 2006/0176149 A1 | 8/2006 | Douglas | |
| 2006/0183505 A1* | 8/2006 | Willrich | 455/566 |
| 2006/0193749 A1 | 8/2006 | Ghazarian et al. | |
| 2006/0203090 A1 | 9/2006 | Wang et al. | |
| 2006/0220826 A1 | 10/2006 | Rast | |
| 2006/0225253 A1 | 10/2006 | Bates | |
| 2006/0244601 A1 | 11/2006 | Nishimura | |
| 2006/0256822 A1 | 11/2006 | Kwong et al. | |
| 2006/0267773 A1 | 11/2006 | Roque | |
| 2006/0270465 A1 | 11/2006 | Lee et al. | |
| 2006/0271287 A1 | 11/2006 | Gold et al. | |
| 2006/0274166 A1 | 12/2006 | Lee et al. | |
| 2006/0274828 A1 | 12/2006 | Siemens et al. | |
| 2006/0275031 A1* | 12/2006 | Ku | H04M 1/0264 396/429 |
| 2006/0276200 A1 | 12/2006 | Radhakrishnan et al. | |
| 2006/0282021 A1 | 12/2006 | DeVaul et al. | |
| 2006/0287821 A1 | 12/2006 | Lin | |
| 2006/0293571 A1 | 12/2006 | Bao et al. | |
| 2007/0021134 A1 | 1/2007 | Liou | |
| 2007/0064108 A1 | 3/2007 | Haler | |
| 2007/0067079 A1 | 3/2007 | Kosugi | |
| 2007/0092237 A1* | 4/2007 | Kim | H04N 5/2251 396/72 |
| 2007/0102508 A1 | 5/2007 | Mcintosh | |
| 2007/0117083 A1 | 5/2007 | Winneg et al. | |
| 2007/0132567 A1 | 6/2007 | Schofield et al. | |
| 2007/0152811 A1 | 7/2007 | Anderson | |
| 2007/0172053 A1 | 7/2007 | Poirier | |
| 2007/0177023 A1 | 8/2007 | Beuhler et al. | |
| 2007/0199076 A1 | 8/2007 | Rensin et al. | |
| 2007/0229350 A1 | 10/2007 | Scalisi et al. | |
| 2007/0257781 A1 | 11/2007 | Denson | |
| 2007/0257782 A1 | 11/2007 | Etcheson | |
| 2007/0257804 A1 | 11/2007 | Gunderson et al. | |
| 2007/0257815 A1 | 11/2007 | Gunderson et al. | |
| 2007/0260361 A1 | 11/2007 | Etcheson | |
| 2007/0268158 A1 | 11/2007 | Gunderson et al. | |
| 2007/0271105 A1 | 11/2007 | Gunderson et al. | |
| 2007/0274705 A1 | 11/2007 | Kashiwa | |
| 2007/0091557 A1 | 12/2007 | Maron et al. | |
| 2007/0285222 A1 | 12/2007 | Zadnikar | |
| 2007/0287425 A1 | 12/2007 | Bates | |
| 2007/0297320 A1 | 12/2007 | Brummette et al. | |
| 2008/0001735 A1 | 1/2008 | Tran | |
| 2008/0002031 A1 | 1/2008 | Cana et al. | |
| 2008/0002599 A1 | 2/2008 | Denny et al. | |
| 2008/0030580 A1 | 2/2008 | Kashhiwa et al. | |
| 2008/0042825 A1* | 2/2008 | Denny et al. | 340/522 |
| 2008/0043736 A1 | 2/2008 | Stanley | |
| 2008/0049830 A1 | 2/2008 | Richardson | |
| 2008/0063252 A1 | 3/2008 | Dobbs et al. | |
| 2008/0084473 A1 | 4/2008 | Romanowich | |
| 2008/0100705 A1 | 5/2008 | Kister et al. | |
| 2008/0122603 A1* | 5/2008 | Plante et al. | 340/439 |
| 2008/0129518 A1 | 6/2008 | Carlton-Foss | |
| 2008/0143481 A1 | 6/2008 | Abraham et al. | |
| 2008/0144705 A1 | 6/2008 | Rackin et al. | |
| 2008/0169929 A1 | 7/2008 | Albertson et al. | |
| 2008/0170130 A1 | 7/2008 | Ollila et al. | |
| 2008/0211906 A1 | 9/2008 | Lovric | |
| 2008/0222849 A1 | 9/2008 | Lavoie | |
| 2008/0239064 A1* | 10/2008 | Iwasaki | 348/47 |
| 2008/0246656 A1 | 10/2008 | Ghazarian | |
| 2008/0266118 A1 | 10/2008 | Pierson et al. | |
| 2008/0307435 A1 | 12/2008 | Rehman | |
| 2008/0316314 A1 | 12/2008 | Bedell et al. | |
| 2009/0002491 A1 | 1/2009 | Haler | |
| 2009/0002556 A1 | 1/2009 | Manapragada et al. | |
| 2009/0027499 A1 | 1/2009 | Nicholl | |
| 2009/0070820 A1 | 3/2009 | Li | |
| 2009/0091651 A1* | 4/2009 | Artsiely | H04N 5/23209 348/340 |
| 2009/0122142 A1 | 5/2009 | Shapley | |
| 2009/0135007 A1 | 5/2009 | Donovan et al. | |
| 2009/0141129 A1* | 6/2009 | Dischinger | G08B 13/19621 348/158 |
| 2009/0169068 A1 | 7/2009 | Okamoto | |
| 2009/0189981 A1 | 7/2009 | Stann et al. | |
| 2009/0195686 A1 | 8/2009 | Shintani | |
| 2009/0207252 A1 | 8/2009 | Raghunath | |
| 2009/0213204 A1 | 8/2009 | Wong | |
| 2009/0243794 A1 | 10/2009 | Morrow | |
| 2009/0251545 A1 | 10/2009 | Shekarri et al. | |
| 2009/0252486 A1 | 10/2009 | Ross, Jr. et al. | |
| 2009/0276708 A1 | 11/2009 | Smith et al. | |
| 2009/0294538 A1 | 12/2009 | Wihlborg et al. | |

(56) References Cited

U.S. PATENT DOCUMENTS

| | | | |
|---|---|---|---|
| 2009/0324203 A1* | 12/2009 | Wiklof | H04N 1/00933 386/291 |
| 2010/0045798 A1 | 2/2010 | Sugimoto et al. | |
| 2010/0050734 A1 | 3/2010 | Chou | |
| 2010/0060747 A1 | 3/2010 | Woodman | |
| 2010/0097221 A1 | 4/2010 | Kreiner et al. | |
| 2010/0106707 A1 | 4/2010 | Brown et al. | |
| 2010/0118147 A1 | 5/2010 | Dorneich et al. | |
| 2010/0122435 A1 | 5/2010 | Markham | |
| 2010/0123779 A1 | 5/2010 | Snyder et al. | |
| 2010/0177193 A1 | 7/2010 | Flores | |
| 2010/0177891 A1 | 7/2010 | Keidar et al. | |
| 2010/0188201 A1 | 7/2010 | Cook et al. | |
| 2010/0191411 A1 | 7/2010 | Cook et al. | |
| 2010/0194885 A1 | 8/2010 | Plaster | |
| 2010/0217836 A1 | 8/2010 | Rofougaran | |
| 2010/0238009 A1 | 9/2010 | Cook et al. | |
| 2010/0238262 A1* | 9/2010 | Kurtz et al. | 348/14.01 |
| 2010/0242076 A1 | 9/2010 | Potesta et al. | |
| 2010/0250021 A1 | 9/2010 | Cook et al. | |
| 2010/0265331 A1 | 10/2010 | Tanaka | |
| 2010/0274816 A1 | 10/2010 | Guzik | |
| 2010/0277591 A1* | 11/2010 | Kowalsky | H04N 5/2252 348/158 |
| 2010/0287473 A1 | 11/2010 | Recesso et al. | |
| 2010/0296571 A1* | 11/2010 | El-Saban | H04N 21/21805 375/240.01 |
| 2011/0005151 A1 | 1/2011 | Beard | |
| 2011/0018998 A1 | 1/2011 | Guzik | |
| 2011/0050904 A1 | 3/2011 | Anderson | |
| 2011/0069151 A1* | 3/2011 | Orimoto | 348/42 |
| 2011/0084820 A1 | 4/2011 | Walter et al. | |
| 2011/0094003 A1 | 4/2011 | Spiewak et al. | |
| 2011/0098924 A1 | 4/2011 | Baladeta et al. | |
| 2011/0129151 A1 | 6/2011 | Saito et al. | |
| 2011/0157759 A1 | 6/2011 | Smith et al. | |
| 2011/0261176 A1 | 10/2011 | Monaghan, Sr. et al. | |
| 2011/0281547 A1 | 11/2011 | Cordero | |
| 2011/0301971 A1 | 12/2011 | Roesch et al. | |
| 2011/0314401 A1 | 12/2011 | Salisbury et al. | |
| 2012/0038689 A1 | 2/2012 | Ishii | |
| 2012/0056722 A1 | 3/2012 | Kawaguchi | |
| 2012/0063736 A1 | 3/2012 | Simmons et al. | |
| 2012/0120258 A1 | 5/2012 | Boutell et al. | |
| 2012/0162436 A1 | 6/2012 | Cordell et al. | |
| 2012/0188345 A1 | 7/2012 | Salow | |
| 2012/0189286 A1 | 7/2012 | Takayama et al. | |
| 2012/0230540 A1 | 9/2012 | Calman et al. | |
| 2012/0257320 A1 | 10/2012 | Brundula et al. | |
| 2012/0268259 A1 | 10/2012 | Igel et al. | |
| 2012/0276954 A1 | 11/2012 | Kowalsky | |
| 2013/0021153 A1 | 1/2013 | Keays | |
| 2013/0033610 A1* | 2/2013 | Osborn | H04N 5/2258 348/207.1 |
| 2013/0035602 A1 | 2/2013 | Gemer | |
| 2013/0080836 A1 | 3/2013 | Stergiou et al. | |
| 2013/0096731 A1 | 4/2013 | Tamari et al. | |
| 2013/0105518 A1* | 5/2013 | McPherson | F41H 9/10 222/153.11 |
| 2013/0148295 A1 | 6/2013 | Minn et al. | |
| 2013/0222640 A1 | 8/2013 | Beak et al. | |
| 2013/0225309 A1 | 8/2013 | Bentley et al. | |
| 2013/0258270 A1* | 10/2013 | Cazalet | G02C 11/10 351/114 |
| 2013/0300563 A1 | 11/2013 | Glaze | |
| 2013/0343572 A1* | 12/2013 | Lee | H04M 1/03 381/92 |
| 2014/0037262 A1 | 2/2014 | Sako | |
| 2014/0047371 A1* | 2/2014 | Palmer | G06F 3/0484 715/771 |
| 2014/0049636 A1 | 2/2014 | O'Donnell et al. | |
| 2014/0071024 A1* | 3/2014 | Fu | G02B 27/0172 345/8 |
| 2014/0092299 A1 | 4/2014 | Phillips et al. | |
| 2014/0094992 A1 | 4/2014 | Lambert et al. | |
| 2014/0098453 A1 | 4/2014 | Brundula et al. | |
| 2014/0140575 A1 | 5/2014 | Wolf | |
| 2014/0170602 A1 | 6/2014 | Reed | |
| 2014/0192194 A1 | 7/2014 | Bedell et al. | |
| 2014/0195105 A1 | 7/2014 | Lambert et al. | |
| 2014/0195272 A1 | 7/2014 | Sadiq et al. | |
| 2014/0210625 A1 | 7/2014 | Nemat-Nasser | |
| 2014/0218544 A1 | 8/2014 | Sent et al. | |
| 2014/0226007 A1* | 8/2014 | Hsu | H04N 7/18 348/143 |
| 2014/0227671 A1 | 8/2014 | Olmstead et al. | |
| 2014/0311215 A1 | 10/2014 | Keays et al. | |
| 2014/0355951 A1 | 12/2014 | Tabak | |
| 2015/0050003 A1 | 2/2015 | Ross et al. | |
| 2015/0051502 A1 | 2/2015 | Ross | |
| 2015/0053776 A1 | 3/2015 | Rose et al. | |
| 2015/0078727 A1 | 3/2015 | Ross et al. | |
| 2015/0088335 A1 | 3/2015 | Lambert et al. | |
| 2015/0103246 A1 | 4/2015 | Phillips et al. | |
| 2015/0229630 A1 | 8/2015 | Smith | |
| 2015/0358549 A1 | 12/2015 | Cho et al. | |
| 2016/0042767 A1 | 2/2016 | Araya et al. | |
| 2016/0050345 A1* | 2/2016 | Longbotham | G02B 27/017 348/47 |
| 2016/0127695 A1* | 5/2016 | Zhang | H04N 5/23206 348/143 |
| 2016/0165192 A1* | 6/2016 | Saatchi | H04N 5/772 386/227 |
| 2016/0364621 A1 | 12/2016 | Hill et al. | |
| 2017/0070659 A1 | 3/2017 | Kievsky et al. | |
| 2017/0195635 A1 | 7/2017 | Yokomitsu et al. | |
| 2017/0230605 A1 | 8/2017 | Han et al. | |
| 2017/0237950 A1 | 8/2017 | Araya et al. | |
| 2017/0244884 A1 | 8/2017 | Burtey et al. | |
| 2017/0277700 A1 | 9/2017 | Davis et al. | |
| 2017/0287523 A1 | 10/2017 | Hodulik et al. | |
| 2018/0023910 A1 | 1/2018 | Kramer | |
| 2018/0050800 A1 | 2/2018 | Boykin et al. | |

FOREIGN PATENT DOCUMENTS

| | | |
|---|---|---|
| GB | 2273624 | 6/1994 |
| GB | 2320389 | 5/1998 |
| GB | 2343252 | 5/2000 |
| GB | 2351055 | 12/2000 |
| GB | 2417151 | 2/2006 |
| GB | 2425427 | 10/2006 |
| GB | 2455885 | 7/2009 |
| GB | 2485804 A | 5/2012 |
| IE | 20090923 | 9/2010 |
| JP | 294188 | 9/1993 |
| JP | 2010395 | 9/1993 |
| JP | 153298 | 6/1996 |
| JP | 198858 | 7/1997 |
| JP | 10076880 A | 3/1998 |
| JP | 2000137263 A | 5/2000 |
| JP | 2005119631 A | 5/2005 |
| KR | 200236817 | 8/2001 |
| KR | 1050897 | 7/2011 |
| RU | 2383915 C2 | 3/2010 |
| RU | 107851 U1 | 8/2011 |
| RU | 124780 U1 | 2/2013 |
| WO | 9005076 | 5/1990 |
| WO | 9738526 | 10/1997 |
| WO | 9831146 | 7/1998 |
| WO | 9948308 | 9/1999 |
| WO | 0039556 | 7/2000 |
| WO | 0051360 | 8/2000 |
| WO | 0123214 A1 | 4/2001 |
| WO | 0249881 | 6/2002 |
| WO | 0209575 | 11/2002 |
| WO | 03049446 | 6/2003 |
| WO | 2004036926 A2 | 4/2004 |
| WO | 2009013526 A1 | 1/2009 |
| WO | 2011001180 A1 | 1/2011 |
| WO | 2012037139 A2 | 3/2012 |

(56) References Cited

FOREIGN PATENT DOCUMENTS

| WO | 2012120083 A1 | 9/2012 |
|---|---|---|
| WO | 2014000161 A1 | 1/2014 |
| WO | 2014052898 A1 | 4/2014 |

OTHER PUBLICATIONS

Nigeria News—Taser develops Robocop-like' technology enabling police officers to record valuable evidence on a wearable camera . . . and hopefully save on expensive lawsuits, Jun. 4, 2013, 5 pages.*
Munchbach, Andrew, "Taser's on-officer cameras catch you in the act, right to remain silent imperative", at https://www.engadget.com/2012/02/21/tasers-on-officer-cameras-catch-you-in-the-act-right-to-remain/, Feb. 21, 2012, 5 pages.*
File History of U.S. Appl. No. 14/040,329, filed Sep. 27, 2013, entitled Portable Video and Imaging System; Applicant: Digital Ally, Inc.
File History of U.S. Appl. No. 13/967,151, filed Aug. 14, 2013, entitled Computer Program, Method, and System for Managing Multiple Data Recording Devices; Applicant: Digital Ally, Inc.
File History of U.S. Appl. No. 14/040,233, filed Sep. 27, 2013, entitled Computer Program, Method, and System for Managing Multiple Data Recording Devices; Applicant: Digital Ally, Inc.
Notification of Transmittal of the International Search Report and the Written Opinion of the International Searching Authority, or the Declaration dated Jan. 30, 2014; International Application No. PCT/US2013/062415; International Filing Date: Sep. 27, 2013; Applicant: Digital Ally, Inc.
Brown, TP-LINK TL-WDR3500 Wireless N600 Router Review, Mar. 6, 2013.
Taser Axon Body on Officer Video/Police Body Camera, http://www.taser.com/products/on-officer-video/axon-body-on-officer-video, Sep. 23, 2013, Date Posted: Unknown, pp. 1-8.
GoPro Official Website: The World's Most Versatile Camera, http://gopro.com/products/?gclid=CKqHv9jT4rkCFWZk7AodyiAAaQ, Sep. 23, 2013, Date Posted: Unknown, pp. 4-9.
Vievu Products, http://www.vievu.com/vievu-products/vievu-squared/, Sep. 25, 2013, Date Posted: Unknown, pp. 1-2.
Digital Ally First Vu Mountable Digital Camera Video Recorder, http://www.opticsplanet.com/digital-ally-first-vu-mountable-digital-camera-video-recorder.html?gclid=CIKohcX05rkCFSlo7AodU0IA0g&ef_id=UjCGEAAAAWGEjrQF:20130925155534:s, Sep. 25, 2013, Date Posted: Unknown, pp. 1-4.
Taser Axon Flex On-Officer Video/Police Video Camera, http://www.taser.com/products/on-officer-video/taser-axon, Sep. 26, 2013, Date Posted: Unknown, pp. 1-8.
Zepcam Wearable Video Technology, http://www.zepcam.com/product.aspx, Sep. 26, 2013, Date Posted: Unknown, pp. 1-2.
Witness Cam headset, http://www.secgru.com/DVR-Witness-Cam-Headset-Video-Recorder-SG-DVR-1-COP.html, Sep. 26, 2013, Date Posted: Unknown, pp. 1-2.
SUV Cam, http://www.elmo.co.jp/suv-cam/en/product/index.html, Sep. 26, 2013, Date Posted: Unknown, p. 1.
Asian Wolf High Quality Angel Eye Body Video Spy Camera Recorder System, http://www.asianwolf.com/covert-bodycam-hq-angeleye.html, Sep. 26, 2013, Date Posted: Unknown, pp. 1-3.
Panasonic Handheld AVCCAM HD Recorder/Player, http://www.panasonic.com/business/provideo/ag-hmr10.asp, Sep. 26, 2013, Date Posted: Unknown, pp. 1-2.
POV.HD System Digital Video Camera, http://www.vio-pov.com/index.php, Sep. 26, 2013, Date Posted: Unknown, pp. 1-3.
Ecplaza HY-001HD law enforcement DVR, http://fireeye.en.ecplaza.net/law-enforcement-dvr--238185-1619696.html, Sep. 26, 2013, Date Posted: Unknown, pp. 1-3.
Edesix VideoBadge, http://www.edesix.com/edesix-products, Sep. 26, 2013, Date Posted: Unknown, pp. 1-3.
Tide Leader police body worn camera, http://tideleader.en.gongchang.com/product/14899076, Sep. 26, 2013, Date Posted: Unknown, pp. 1-3.
Stalker VUE Law Enforcement Grade Body Worn Video Camera/Recorder, http://www.stalkerradar.com/law_vue.shtml, Sep. 26, 2013, Date Posted: Unknown, pp. 1-2.
Vidmic Officer Worn Video & Radio Accessories, http://www.vidmic.com/, Sep. 26, 2013, Date Posted: Unknown, p. 1.
WatchGuard CopVu Wearable Video Camera System, http://watchguardvideo.com/copvu/overview, Sep. 26, 2013, Date Posted: Unknown, pp. 1-2.
Kustom Signals VieVu, http://www.kustomsignals.com/index.php/mvideo/vievu, Sep. 26, 2013, Date Posted: Unknown, pp. 1-4.
WolfCom 3rd Eye, X1 A/V Recorder for Police and Military, http://wolfcomusa.com/Products/Products.html, Sep. 26, 2013, Date Posted: Unknown, pp. 1-3.
RevealMedia RS3-SX high definition video recorder, http://www.revealmedia.com/buy-t166/cameras/rs3-sx.aspx, Sep. 26, 2013, Date Posted: Unknown, pp. 1-2.
Spy Chest Mini Spy Camera / Self Contained Mini camcorder / Audio & Video Recorder, http://www.spytechs.com/spy_cameras/mini-spy-camera.htm, Sep. 26, 2013, Date Posted: Unknown, pp. 1-3.
Lea-Aid Scorpion Micro Recorder Patrol kit,http://www.leacorp.com/products/SCORPION-Micro-Recorder-Patrol-kit.html, Sep. 26, 2013, Date Posted: Unknown, pp. 1-2.
Veho MUVI portable wireless speaker with dock, http://veho-uk.fastnet.co.uk/main/shop.aspx?category=camcorder, Sep. 26, 2013, Date Posted: Unknown, p. 1.
Veho MUVI HD, http://veho-uk.fastnet.co.uk/main/shop.aspx?category=CAMMUVIHD, Sep. 26, 2013, Date Posted: Unknown, pp. 1-5.
SIV Security in Vehicle Driving Partner, http://www.siv.co.kr/, Sep. 26, 2013, Date Posted: Unknown, p. 1.
Midland XTC HD Video Camera, http://midlandradio.com/Company/xtc100-signup, Sep. 26, 2013, Date Posted: Unknown, pp. 1-3.
Freudenrich, Craig, Ph.D.; "How Breathalyzers Work—Why Test?." HowStuffWorks. Printed Date: Oct. 16, 2014; Posted Date: Unknown; <http://electronics.howstuffworks.com/gadgets/automotive/breathalyzer1.htm>.
"Breathalyzer." Wikipedia. Printed Date: Oct. 16, 2014; Date Page Last Modified: Sep. 14, 2014; <http://en.wikipedia.org/wiki/Breathalyzer>.
Renstrom, Joell; "Tiny 3D Projectors Allow You to Transmit Holograms From a Cell Phone." Giant Freakin Robot. Printed Date: Oct. 16, 2014; Posted Date: Jun. 13, 2014; <http://www.giantfreakinrobot.com/sci/coming-3d-projectors-transmit-holograms-cell-phone.html>.
Kopin Corporation; Home Page; Printed Date: Oct. 16, 2014; Posted Date: Unknown; <http://www.kopin.com>.
Wasson, Brian; "Digital Eyewear for Law Enforcement." Printed Date: Oct. 16, 2014; Posted Date: Dec. 9, 2013; <http://www.wassom.com/digital-eyewear-for-law-enforcement.html>.
"Stalker Press Room—Using In-Car Video, the Internet, and the Cloud to keep police officers safe is the subject of CopTrax live, free webinar." Stalker. Printed Date: Oct. 16, 2014; Posted Date: Jul. 31, 2014.
Notification of Transmittal of the International Search Report and the Written Opinion of the International Searching Authority, or the Declaration dated Feb. 4, 2016; International Application No. PCT/US2015/056052; International Filing Date: Oct. 16, 2015; Applicant: Digital Ally, Inc.
ATC Chameleon. Techdad Review [Online] Jun. 19, 2013 [Retrieved on Dec. 30, 2015]. Retrieved from Internet. <URL:http://www.techdadreview.com/2013/06/19atc-chameleon/>.
Automation Systems Article, Know-How Bank Co. Ltd. Takes Leap Forward as a Company Specializing in R&D and Technology Consulting, published Jan. 2005.
Car Rear View Camera—Multimedia Rear View Mirror—4' LCD color monitor, Retrieved from the Internet: <URL: http://web.archive.org/web/20050209014751/http://laipac.com/multimedia-rear-mirror.htm>, Feb. 9, 2005.
Controller Area Network (CAN) Overview, National Instruments White Paper (Aug. 1, 2014.

(56) References Cited

OTHER PUBLICATIONS

Daskam, Samuel W., Law Enforcement Armed Robbery Alarm System Utilizing Recorded Voice Addresses Via Police Radio Channels, Source: Univ. of Ky, Off of Res and Eng., Sery (UKY BU107), pp. 18-22, 1975.
*Digital Ally* vs. *Taser International, Inc.*, Case No. 2:16-cv-232 (CJW/TJ); US D. Kan, Defendant Taser International Inc.'s Preliminary Invalidity Contentions, Jul. 5, 2016.
Electronic Times Article, published Feb. 24, 2005.
Supplementary European Search Report dated Sep. 28, 2010 in European Patent Application No. 06803645.8; Applicant: Digital Ally, Inc.
W. Fincham, Data Recorders for Accident Investigation, Monitoring of Driver and Vehicle Performance (Digest No. 1997/122), Publication Date: Apr. 10, 1997, pp. 6/1-6/3.
Frankel, Harry; Riter, Stephen, Bernat, Andrew, Automated Imaging System for Border Control, Source: University of Kentucky, Office of Engineering Services, (Bulletin) UKY BU, pp. 169-173, Aug. 1986.
Guide to Bluetooth Security: Recommendations of the National Institute of Standards and Technology, National Institute of Standards and Technology, U.S. Dep't of Commerce, NIST Special Publication 800-121, Revision 1 (Jun. 2012).
Hankyung Auto News Article, Know-How Bank's Black Box for Cars "Multi-Black Box," Copyright 2005.
ICOP Extreme Wireless Mic, Operation Supplement, Copyright 2008.
ICOP Model 20/20-W Specifications; Enhanced Digital In-Car Video and Audio recording Systems, date: Unknown.
ICOP Mobile DVRS; ICOP Model 20/20-W & ICOP 20/20 Vision, date: Unknown.
Bertomen, Lindsey J., PoliceOne.com News; "Product Review: ICOP Model 20/20-W," May 19, 2009.
ICOP Raytheon JPS communications, Raytheon Model 20/20-W, Raytheon 20/20 Vision Digital In-Car Video Systems, date: Unknown.
Overview of the IEEE 802.15.4 standards for Low rate Wireless Personal Area Networks, 2010 7th International Symposium on Wireless Communication Systems (ISWCS), Copyright 2010.
Translation of Korean Patent No. 10-1050897, published Jul. 20, 2011.
Lewis, S.R., Future System Specifications for Traffic Enforcement Equipment, S.R. 1 Source: IEE Colloquium (Digest), N 252, Publication Date: Nov. 18, 1996, pp. 8/1-8/2.
Lilliput RV 18-50NP 5" Rear View Mirror TFT LCD Screen with Camera, Retrieved from the Internet: <URL: http://www.case-mod.com/lilliput-rv1850np-rear-view-mirror-tft-lcd-screen-with-camera-p-1271.html>, Mar. 4, 2005.
Motor Magazine Article, Recreating the Scene of an Accident, published 2005.
Near Field Communication; Sony Corporation; pp. 1-7, Date: Unknown.
New Rearview-Mirror-Based Camera Display Takes the Guesswork Out of Backing Up Retrieved from the Internet: <URL: httb://news.thomasnet.com/fullstory/497750>, Press Release, Oct. 30, 2006.
Notification of Transmittal of the International Search Report and the Written Opinion of the International Search Authority, or the Declaration dated Jan. 14, 2016, International Application No. PCT/US2015/056039; International Filing date Oct. 16, 2015, Applicant: Digital Ally, Inc.
City of Pomona Request for Proposals for Mobile Video Recording System for Police Vehicles, dated prior to Apr. 4, 2013.
Request for Comment 1323 of the Internet Engineering Task Force, TCP Extensions for High Performance, Date: May 1992.
SIIF Award for Multi Black Box, published Dec. 10, 2004.
U.S. Appl. No. 13/959,142 Final Office Action dated Jul. 20, 2016.
U.S. Appl. No. 13/959,142 Office Action dated Nov. 3, 2015.
U.S. Appl. No. 15/011,132 Office Action dated Apr. 18, 2016, 19 pages.

State of Utah Invitation to Bid State Cooperative Contract; Vendor: ICOP Digital, Inc., Contract No. MA503, Jul. 1, 2008.
http://www.k-h-b.com/board/board.php?board=products01&comand=body&no=1, Current State of Technology Held by the Company, Copyright 2005.
http://www.k-h-b.com/sub1_02.html, Copyright 2005.
X26 Taser, Date Unknown.
Taser International; Taser X26 Specification Sheet, 2003.
Dees, Tim; Taser Axon Flex: The next generation of body camera; <http://www.policeone.com/police-products/body-cameras/articles/527231-0-TASER-Axon-Flex-The-next-generation-of-body-camera/>, Date Posted: Mar. 12, 2012; Date Printed: Oct. 27, 2015.
International Association of Chiefs of Police Digital Video System Minimum Specifications; Nov. 21, 2008.
Petition for Inter Partes Review No. 2017-00375, *Taser International, Inc.* v. *Digital Ally, Inc.*, filed Dec. 1, 2013.
Petition for Inter Partes Review No. 2017-00376, *Taser International, Inc.* v. *Digital Ally, Inc.*, filed Dec. 1, 2013.
Petition for Inter Partes Review No. 2017-00515, *Taser International, Inc.* v. *Digital Ally Inc.*, filed Jan. 11, 2017.
PCT Patent Application PCT/US16/34345 International Search Report and Written Opinion dated Dec. 29, 2016.
*Digital Ally, Inc.* vs. *Taser International, Inc.*, Case No. 2:16-cv-020232 (CJM/TJ); US D. Kan, Complaint for Patent Infringement, Jan. 14, 2016.
*Digital Ally, Inc.* vs. *Enforcement video LLC d/b/a Watchguard Video.*, Case No. 2:16-cv-02349 (CJM/TJ); US D. Kan, Complaint for Patent Infringement, May 27, 2016.
State of Utah Invitation to Bid State Cooperative Contract; Vendor: Kustom Signals Inc., Contract No. MA1991, Apr. 25, 2008.
Petition for Inter Partes Review No. 2017-00775, *Taser International, Inc.* v. *Digital Ally Inc.*, filed Jan. 25, 2017.
Invalidity Chart for International Publication No. WO2014/000161 dated Oct. 31, 2017.
Petition for Post Grant Review No. PGR2018-00052, *Axon Enterprise, Inc.* v. *Digital Ally, Inc.*, filed Mar. 19, 2018.
MPEG-4 Coding of Moving Pictures and Audio ISO/IEC JTC1/SC29/WG11 N4668 dated Mar. 2002.
Invalidity Chart for International Publication No. WO2014/000161 dated Oct. 31, 2017 (Resubmitted).
Drift X170, http://driftinnovation.com/support/firmware-update/x170/, Sep. 26, 2013, Date Posted: Unknown, p. 1.
UCorder Pockito Wearabel Mini Pcket Camcorder, http://www.ucorder.com/, Sep. 26, 2013, Date Posted: Unknown, p. 1.
Isaw Advance Hull HD EXtreme, www.isawcam.co.kr, Sep. 26, 2013, Date Posted: Unknown, p. 1.
Scorpion Micro DV Video Audio Recorder, http://www.leacorp.com/scorpion-micro-dv-video-audio-recorder/, Sep. 26, 2013, Date Posted: Unknown, pp. 1-3.
Taser Cam Law Enforcement Audio/Video Recorder (gun mounted), http://www.taser.com/products/on-officer-video/taser-cam, Sep. 26, 2013, Date Posted: Unknown, pp. 1-3.
Looxcie Wearable & mountable streaming video cams, http://www.looxcie.com/overview?gclid=-CPbDyv6piq8CFWeFQAodlhXC-w, Sep. 26, 2013, Date Posted: Unknown, pp. 1-4.
Point of View Cameras Military & Police, http://pointofviewcameras.com/military-police, Sep. 26, 2013, Date Posted: Unknown, pp. 1-2.
Dyna Spy Inc. hidden cameras, https://www.dynaspy.com/hidden-cameras/spy-cameras/body-worn-wearable-spy-cameras, Sep. 26, 2013, Date Posted: Unknown, pp. 1-3.
Amazon.com wearable camcorders, http://www.amazon.com/s/ref=nb_sb_ss_i_0_4?url=search-alias%3Dphoto&field-keywords=wearable+camcorder&x=0&y=0&sprefix=wear, Sep. 26, 2013, Date Posted: Unknown, pp. 1-4.
Oregon Scientific ATC Chameleon Dual Lens HD Action Camera, http://www.oregonscientificstore.com/Oregon-Scientific-ATC-Chameleon-Dual-Lens-HD-Action-Camera.data, Date Posted: Unknown; Date Printed: Oct. 13, 2014, pp. 1-4.
European Patent Application 15850436.6 Search Report dated May 4, 2018.

\* cited by examiner

Parallel Optical Axes

Reciprocal Optical Axes

Skew Optical Axes

DUAL LENS CAMERA UNIT

RELATED APPLICATIONS

This non-provisional patent application is a continuation-in-part application and claims priority benefit, with regard to all common subject matter, of commonly assigned U.S. patent application Ser. No. 13/967,151, filed Aug. 14, 2013, and entitled "COMPUTER PROGRAM, METHOD, AND SYSTEM FOR MANAGING MULTIPLE DATA RECORDING DEVICES" ("the '151 Application"). The '151 Application is hereby incorporated by reference in its entirety into the present application.

Embodiments and/or features of the invention described in the present document may be used with the subject matter disclosed in commonly assigned U.S. Pat. No. 8,781,292, filed Sep. 27, 2013, issued Jul. 15, 2014, and entitled "COMPUTER PROGRAM, METHOD, AND SYSTEM FOR MANAGING MULTIPLE DATA RECORDING DEVICES" ("the '292 Patent"), which is a continuation application of the '151 Application. The '292 Patent is hereby incorporated by reference in its entirety into the present application.

Embodiments and/or features of the invention described in the present document may be used with the subject matter disclosed in commonly assigned U.S. patent application Ser. No. 14/040,329, filed Sep. 27, 2013, and entitled "PORTABLE VIDEO AND IMAGING SYSTEM" ("the '329 Application"); and commonly assigned U.S. patent application Ser. No. 14/040,006, filed Sep. 27, 2013, and entitled "MOBILE VIDEO AND IMAGING SYSTEM" ("the '006 Application"). The '329 Application and the '006 Application are hereby incorporated by reference in their entirety into the present application.

Further, embodiments and/or features of the invention described in the present document may be used with the subject matter disclosed in commonly assigned and concurrently filed U.S. patent application Ser. No. 14/517,368 filed Oct. 17, 2014, and entitled "FORENSIC VIDEO RECORDING WITH PRESENCE DETECTION," and with concurrently filed and commonly assigned U.S. patent application Ser. No. 14/517,160 filed Oct. 17, 2014, and entitled "BREATH ANALYZER, SYSTEM, AND COMPUTER PROGRAM FOR AUTHENTICATING, PRESERVING, AND PRESENTING BREATH ANALYSIS DATA." Each of the concurrently filed patent applications is also a continuation-in-part of the '151 Application. The concurrently filed patent applications are hereby incorporated by reference in their entirety into the present application.

BACKGROUND

1. Field

Embodiments of the invention relate to a multi-lens camera unit for recording video images. More particularly, embodiments of the invention relate to a portable digital video system sized to be worn on the user's body and equipped with a plurality of lens assemblies for recording video in a plurality of directions.

2. Related Art

There is a need for wearable video recording devices for purposes such as law enforcement, as prior devices are limited to capturing video in a single direction. Thus, in the case of a head-mounted unit, events occurring behind and to a side of the user are not recorded.

SUMMARY

Embodiments of the invention solve the above problem by providing an apparatus and method for a wearably sized, multi-lens digital recorder. In a first embodiment, the invention includes a camera unit comprising a first lens assembly, a second lens assembly, a first housing containing the first lens assembly and the second lens assembly, a battery unit, a first storage memory, controller circuitry operable to receive video data from the first lens assembly and the second lens assembly and store the video data in the first storage memory, and a second housing containing the battery unit and attached via a cable to the first housing unit.

A second embodiment includes a method of controlling the operation of a camera unit comprising the steps of storing imagery from a first lens assembly and a nonparaxial second lens assembly to a first storage memory, receiving a trigger signal in response to a trigger event, transferring an imagery from the first storage memory to a second storage memory, and in response to the trigger signal, storing imagery from the first lens assembly and the second lens assembly to the second storage memory.

A third embodiment of the invention includes a dual-lens camera apparatus, comprising a camera housing including a plurality of non-paraxial lens assemblies, a battery housing connected by a cable to the camera housing and providing power thereto, a volatile memory, and a non-volatile memory.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Figure 2A:
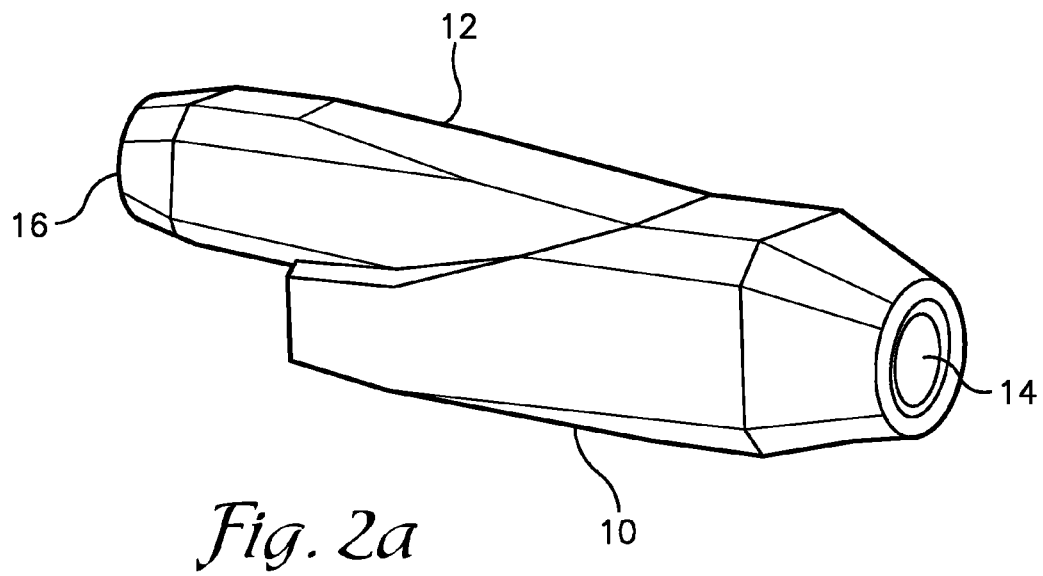
Figure 2B:
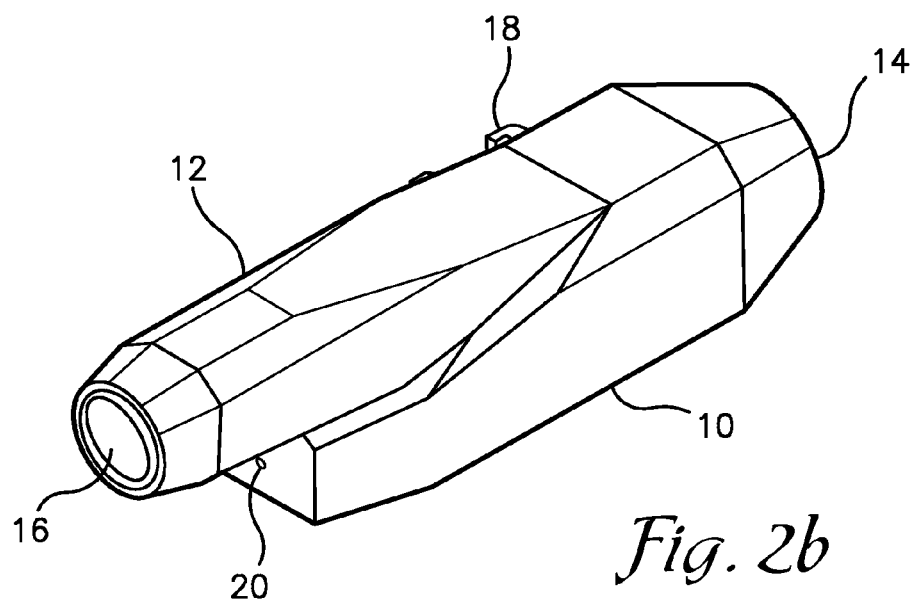
Figure 3A:
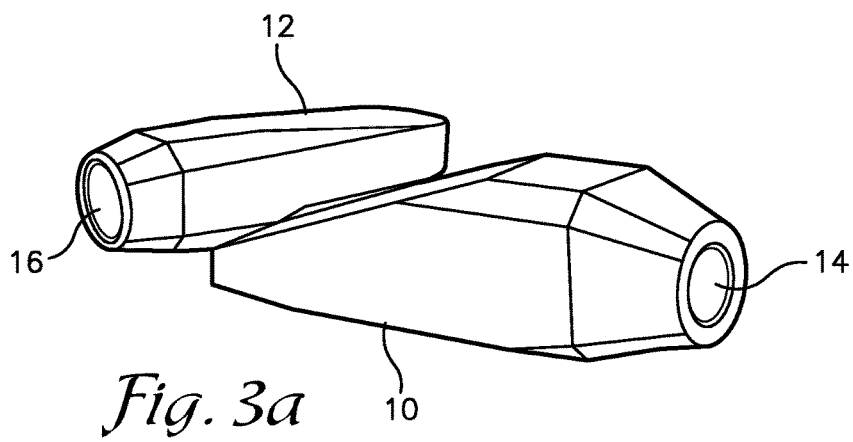
Figure 3B:
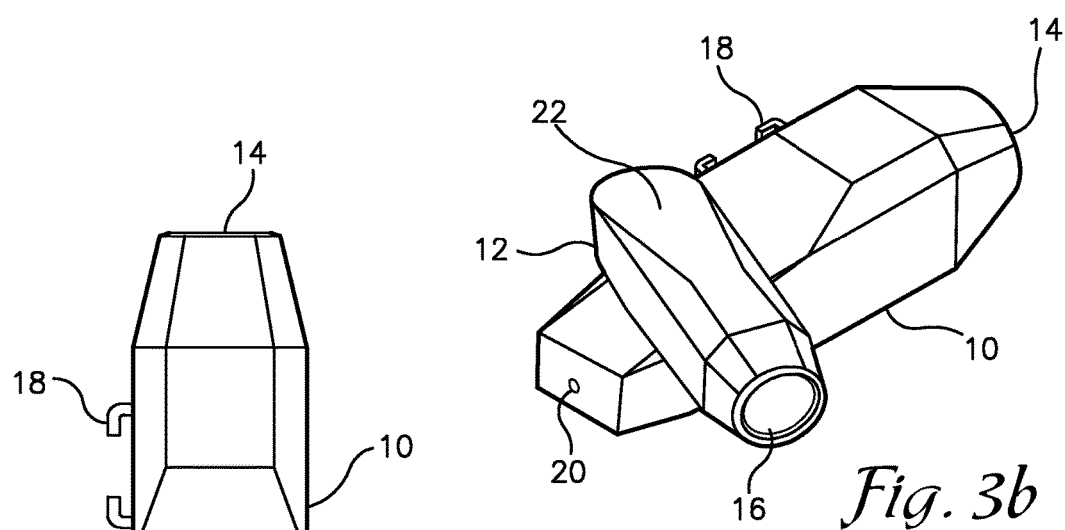
Figure 3C:
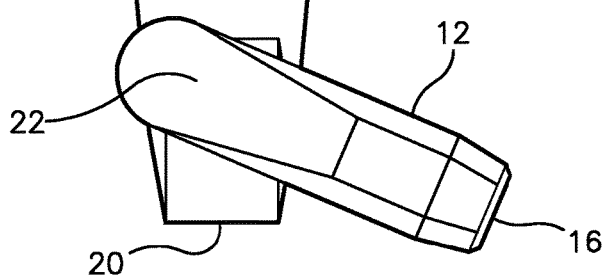
Figure 4A:
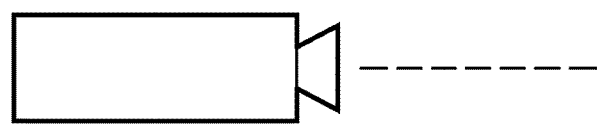
Figure 4A:
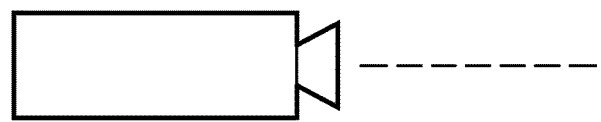
Figure 4B:
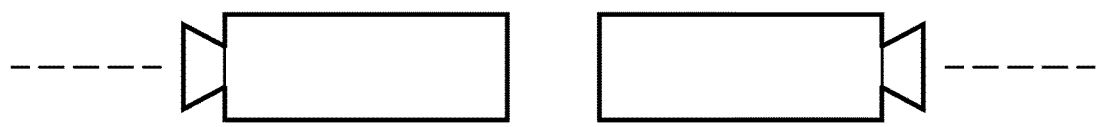
Figure 4C:
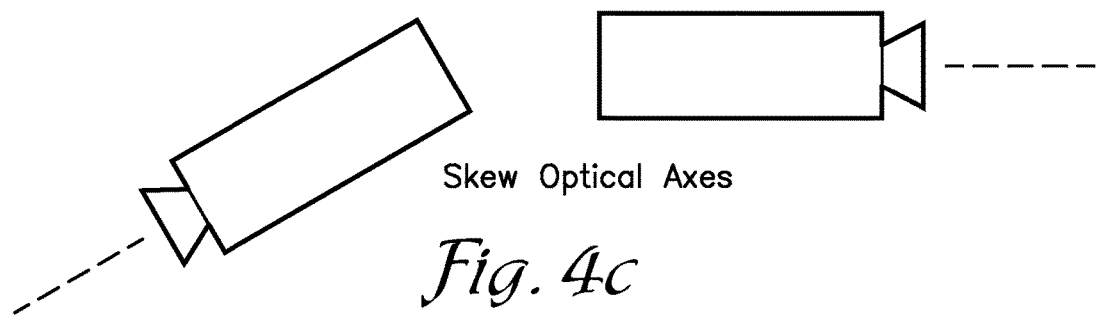

FIG. 1 depicts a system diagram showing the components of one embodiment of the invention;

FIGS. 2(a) and 2(b) depict a first and second view of one embodiment of the invention with the lenses fixedly mounted in a reciprocal orientation;

FIGS. 3(a)-3(c) depict a first and a second view of another embodiment of the invention with the lenses rotatably mounted and shown in a skew orientation;

FIGS. 4(a)-4(c) depict a variety of exemplary lens orientations; and

Figure 5:
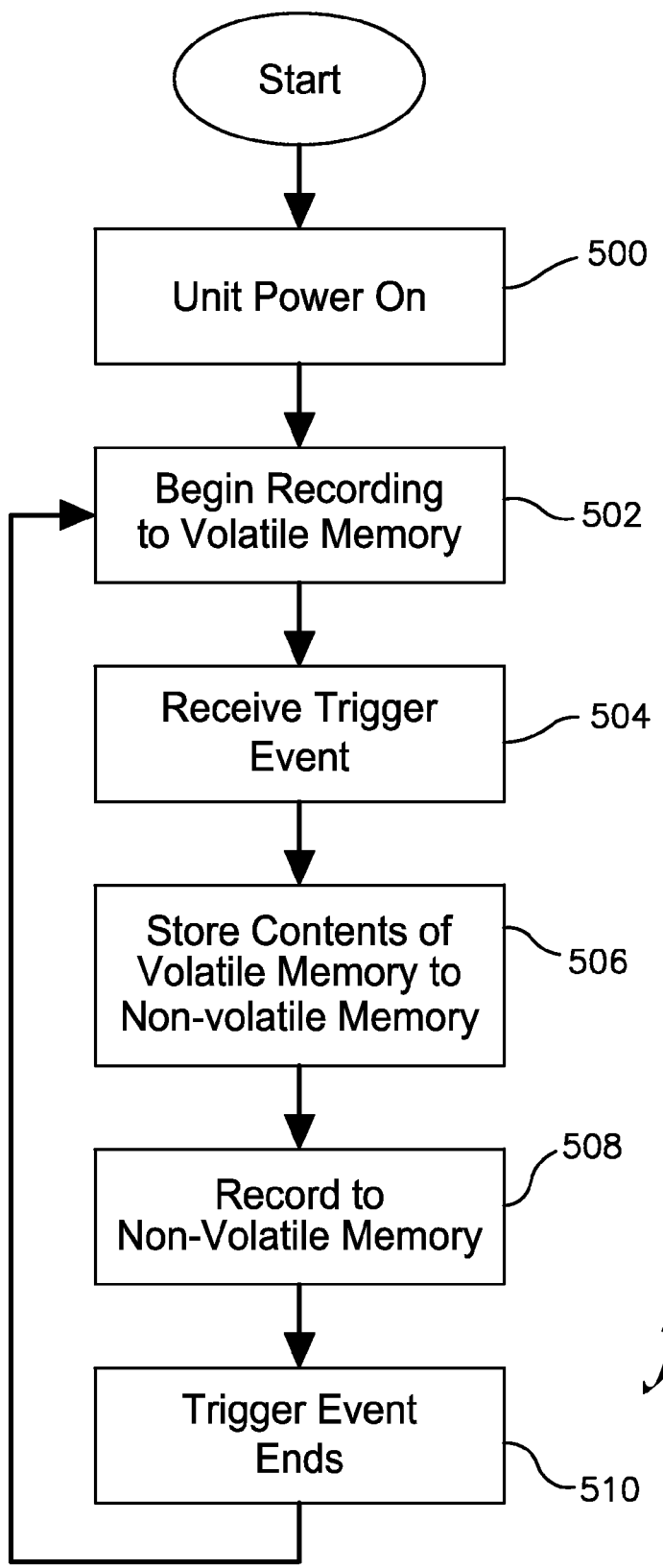

FIG. 5 depicts a flowchart illustrating the operation of one embodiment of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments," mean that the feature or features being referred to are included in at least one embodiment of the technology. Separate reference to "one embodiment," "an embodiment," or "embodiments," in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Embodiments of the invention may be embodied as, among other subject matter, a method, a system, or a set of instructions embodied on one or more computer-readable media. Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Different forms of computer-readable media store data in different ways. For example, volatile storage media such as RAM may retain data only as long as it is powered, while non-volatile media such as flash memory retain data even when powered off. Furthermore, some forms of computer storage media are write-once, read many (WORM), such that data can be stored to them but not erased or overwritten. For some forms of WORM media, data can be recorded in multiple sessions, where the data from one session is appended to the data from the previous session. Other forms of media may be indefinitely rewriteable. Some forms of media may be encrypted, such that data is written to them encrypted by an encryption key (which can correspond to the device, the user, or be unique in some other way) and data read from them is scrambled unless decrypted with the corresponding decryption key.

Additionally, storage media can be made tamper-resistant such that it is difficult or impossible to alter or erase data stored to them, or to prevent reading data except by authorized means. WORM media or encrypted media, as described above are one way to make storage media tamper resistant. Another way is to make storage media physically difficult to remove, such as by covering them with epoxy after they have been installed. Other methods of making storage resistant tamper resistant are also known in the art and can be used.

Turning first to FIG. 1, a system diagram showing the components of one embodiment of the invention is depicted. In some embodiments, lens housing 100 is a streamlined, miniature shape as depicted in FIGS. 2 and 3. In some embodiments, lens housing 100 is less than or equal to ten inches long. In other embodiments, lens housing 100 measures less than or equal to six inches in length. In still other embodiments, lens housing 100 measures less than or equal to four inches in length. In yet other embodiments, lens housing 100 measures less than or equal to two inches long. In some embodiments, lens housing 100 is less than or equal to one and one-half inches in diameter. In other embodiments, lens housing 100 is less than or equal to one inch in diameter. In still other embodiments, lens housing is less than or equal to one-half inch in diameter. In other embodiments, lens housing 100 is a head-mounted display form factor incorporating an eyepiece. In yet other embodiments, lens housing 100 is a low profile, lapel- or epaulet-mounted form factor. Other form factors for lens housing 100 are also possible.

Mounted inside lens housing 100 are lens assemblies 102 and 104. In some embodiments, additional lens assemblies may also be present. Each such lens assembly has an optical axis, defined as the ray passing through the center of the lens and oriented in the direction the lens assembly is pointed. Thus, the optical axis determines the field of view for the lens assembly. In one embodiment, lens assemblies 102 and 104 are fixedly mounted in lens housing 100 such that their optical axes are reciprocal. In another embodiment lens assemblies 102 and 104 are mounted in lens housing 100 such that their lens assemblies are skew. Such lens orientations are discussed in greater detail with respect to FIG. 4. In still another embodiment, one or both of lens assemblies 102 and 104 are rotatably mounted to lens housing such that their optical axes can be adjusted according to need. Such rotatable mounts may be freely rotatable in a plane or along two axes, and may have one or more detents determining preset positions.

Each of lens assemblies 102 and 104 is operable to provide a video feed of video data. While reference is made to "video data" and "video feeds," In some embodiments, lens assemblies 102 and 104 may instead, or in addition, record still image data. In some such embodiments, one of lens assembly 102 and 104 will record video data and the other will record still image data.

In certain embodiments, lens housing 100 may also include a display 106. In some such embodiments, an actuator is included to switch display 106 between the available video feeds from lens assemblies 102, 104 or other lens assemblies or no feed. In some such embodiments, the actuator is mounted in lens housing 100, display 106, or battery housing 108. In some embodiments, display 106 may be a monocular display for displaying the video feed from lens assembly 102, lens assembly 104, or both. In other embodiments, display is a glassless holographic display. Where present, display 106 generally may be any form of image display technology now known or hereafter discovered invented. In some embodiments, display 106 is not integrated into lens housing 100, but rather removably attached, either directly or via a cable or wireless connection. In other embodiments, display is not connected to lens housing 100 directly, but rather via battery housing 108.

In some embodiments, lens housing 100 will also have an attachment point 110 for connecting to one of a variety of suitable mounts. This attachment point may be purely mechanical, or may incorporate data connections for connection to display 106, battery housing 108, and/or other peripheral units. Examples of such attachment points include screw mounts, clip mounts, ball-and-socket mounts, friction mounts, and snap mounts. Any type of mounting hardware, now known or hereafter discovered may be used.

In some embodiments, lens housing 100 is connected to battery housing 108 via cable 112. In some embodiments, cable 112 provides power to lens assemblies 102 and 104, and other components mounted in or attached to lens housing 100. In other embodiments, cable 112 incorporates unidirectional or bidirectional data connections between components mounted in or attached to lens housing 100 and components mounted in or attached to battery housing 108. In these embodiments, cable 112 is communicatively coupled to lens assemblies 102 and 104. In some such embodiments, cable 112 is further communicatively coupled to display 106. In some embodiments, cable 112 is not connected directly to lens housing 100, but rather indirectly via a mount connected to attachment point 110 or otherwise. In still other embodiments, communication between lens housing 100 and battery housing 108 is a wireless connection such as that provided by a personal-area network (PAN), and there is no physical connection between the two housings.

In some embodiments where it is present, cable 112 also connects to battery housing 108. In other embodiments, there may not be a separate battery housing 108, but rather all of the components described herein are mounted in lens housing 100. In other embodiments, some of the components described here as mounted in battery housing 108 are instead mounted in lens housing 100. Similar to lens housing 100, in some embodiments, battery housing 108 also has an attachment point 114. Attachment point 114 can take the form of a spring clip for attachment to clothing or a belt, or can be a universal connector that can attach to a variety of mounts. Other forms of attachment point 114 are also possible.

In some embodiments, power supply 116 is mounted in battery housing 108. In some embodiments, power supply 116 is a set of rechargeable battery cells. These cells can be removable for recharging or chargeable via an external connection. In other embodiments, power supply is one or more non-rechargeable batteries. In still other embodiments, power supply 116 is a fuel cell or micro-turbine. Any form of power supply, now known or hereafter invented may be used as power supply 116. It is an advantage of embodiments of the invention with separate lens housing 100 and battery housing 108 that the weight and volume consumed by power supply 116 is separated from lens housing 100, allowing lens housing to be more comfortably mounted on the user's body, such as in a head-mounted configuration. In some embodiments, power supply is electrically coupled to lens assemblies 102 and 104. In other assemblies, it is further electrically coupled to display 106. Power supply 116 may also be electrically coupled to other components mounted in battery housing 108. In some embodiments, separate power supplies may be provided for components in lens housing 100 and battery housing 108.

In some embodiments, battery housing 108 also contains controller circuitry 118. In various embodiments, controller circuitry 118 performs different functions associated with the operation of the camera unit including video encoding, trigger event detection, storage management, and input/output (I/O) control, as well as other functions known in the art. Controller circuitry 118 may take the form of a microcontroller, microprocessor, or special-purpose controller circuitry. Controller circuitry 118 may also incorporate one or more computer-readable media for storing device firmware. Controller circuitry 118 is electrically coupled to power source 116, and communicatively coupled to lens assemblies 102 and 104 as well as various components installed in battery housing 108, including storage memories such as volatile memory 120 and non-volatile memory 122, sensors such as sensor 124, and I/O ports and controllers such as I/O unit 126. One exemplary method of operation for controller circuitry 118 is depicted in FIG. 5.

Encoded video data and other data processed by controller circuitry 118 may be stored in one or more memories such as volatile memory 120 or non-volatile memory 122. In one embodiment, video is recorded continuously, along with any relevant metadata, and stored in volatile memory 120. When a triggering event occurs, the contents of volatile memory 120 are transferred to non-volatile memory 122, and incoming video is also stored in non-volatile memory. In other embodiments, two non-volatile or volatile memories are used. In yet other embodiments, a single memory is used. In some single-memory embodiments, all video data is stored to non-volatile memory 122. In other single-memory embodiments, a triggering event initiated the recording and storage of data. In some embodiments, non-volatile memory 122, volatile memory 120, or both provide authenticated, tamper-resistant storage such that recorded data can be used as evidence in legal proceedings. In some embodiments, controller circuitry 118 uses a device-specific key to digitally sign or otherwise authenticate video recordings. In some embodiments, non-volatile memory 122 is a removable memory card. In some such embodiments, non-volatile memory is write-once, read-many (WORM) memory. In general, the storage memories used in embodiments of the invention can be any data storage media known in the art as described herein or invented in the future. In some embodiments, battery housing 108 has no persistent storage memory, and video data that is to be retained is transmitted in real time over a network to a remote data store. In other embodiments, data to be retained is both stored locally and transmitted to a remote data store.

In some embodiments, additional sensors such as sensor 124 are present in battery housing 108, lens housing 100, or elsewhere. Such sensors may provide data to supplement the video data provided by lens assemblies 102 and 104. Examples of such sensors include a microphone for recording audio data, a radio receiver for recording radio transmissions, a global-positioning system (GPS) receiver for recording position data, one or more accelerometers for recording movement and acceleration data, and a radio-frequency identifier (RFID) receiver for recording the presence of nearby RFID tags such as RFID tag 128 in other units. RFID tag 128 can, in turn, be read by sensors present in other camera units, or by readers in an associated system such as a unit mounted in a patrol car. Such associated systems may also have their own RFID tags. Although the above discussion references RFID tags and readers, any wireless signaling mechanism can be used to similar effect. Additional sensors, such as a holster event sensor, may be directly or wirelessly connected. Sensor 124 may include or take the form of other sensors and transceivers now known or hereafter invented.

In some embodiments, battery housing 108 or lens housing 100 may also contain an I/O unit such as I/O unit 126. Such an I/O unit may allow additional modules such as those containing additional sensors to be attached. In some embodiments, I/O unit allows data from storage memories 120 and 122 to be transferred off of the device. In other embodiments, it allows controller circuitry 118 to be reprogrammed. In yet other embodiments, it allows power supply 116 to be recharged. It will be apparent to a person skilled in the art that I/O unit 126 may perform all of these functions, individually or in parallel.

Turning now to FIG. 2, two views of one embodiment of the lens housing are presented. FIG. 2(*a*) presents a front-right perspective view. As depicted, lens housing 100 is comprised of forward lens housing 10 and rear lens housing 12. Forward lens housing 10 contains forward lens assembly 14, corresponding to first lens assembly 102 in FIG. 1. Similarly, rear lens housing 12 contains rear lens assembly 16, corresponding to second lens assembly 104 in FIG. 1. In this embodiment, forward lens housing 10 and rear lens housing 12 are fixedly attached such that forward lens assembly 14 and rear lens assembly 16 are oriented such that they have reciprocal optical axes. In one embodiment, forward lens housing 10 and rear lens housing 12 are formed into a single integral unit. In another embodiment, they are formed separately but permanently attached. In still another embodiment, rear lens assembly 12 is removeably attached to front assembly 10. In some such embodiments, modular assemblies may be used such that front lens assembly 14 and/or rear lens assembly 16 can be substituted with a wide-angle or zoom lens as the occasion requires. FIG. 2(*b*) shows a rear-right perspective view of this embodiment, further illustrating the arrangement of the above-described components. FIG. 2(*b*) further depicts mounting clip 18, corresponding to attachment point 110 in FIG. 1. Here, mounting clip 18 is suitably positioned for attachment to the right side of the user's head or body. Mounting clip 18 allows lens housing 100 to be attached to a wide variety of interchangeable mounts. Examples of such mounts include an earpiece, a headband, a hat clip, a shoulder clip, an epaulet mount, an eyeglass mount, and a collar mount. In general, mounts can include, but are not limited to, any way of attaching lens housing 100 to the user's body.

Also shown is port 20, which, in this embodiment, accepts cable 112. It is an advantage of this embodiment of the invention that the separation between lens housing 100 and battery housing 108 allows the depicted battery housing to be much smaller and more compact than is possible with single unit with all of the components depicted in lens housing 100 and battery housing 108 mounted in a single housing. As shown, lens housing 100 is less than two inches in length and one-half inch in diameter.

Turning now to FIG. 3, three views of an alternate embodiment of the lens housing are presented. FIG. 3(*a*) depicts a front-right perspective view corresponding to FIG. 2(*a*). In this embodiment, forward lens housing 10 and rear lens housing 12, rather than being an integral unit, are rotatably attached by pivot 22. Pivot 22 rotates around an axis normal to the ground and defines the common plane of the respective optical axes of front lens assembly 14 and rear lens assembly 16. FIG. 3(*b*), corresponding to the right-rear perspective view of FIG. 2(*b*), further depicts the arrangements of the rotatable rear lens housing. As discussed above, rear lens housing 12 may be freely rotatable or pivot 22 may have a number of detents corresponding to preselected angles. For example, detents may be included for positions of rear lens housing 12 such that rear lens assembly 16 is angled 90°, 180°, or 270° from front lens assembly 14. In another embodiment, detents additionally be included corresponding to angles or 45°, 135°, 225° and 315°. In another embodiment, pivot 22 is a friction pivot such that rear lens assembly can be adjusted such that rear lens assembly 16 and front lens assembly 14 form any angle. In still another embodiment, pivot 22 is a screw-type pivot such that it can be loosened, the angle between rear lens assembly 16 and front lens assembly 14 adjusted, and re-tightened such that the angle remains fixed. In yet another embodiment, both front lens housing 10 and rear lens housing 12 rotate around pivot 22 such that they can be independently oriented. FIG. 3(*c*) depicts an overhead view of this embodiment, more clearly illustrating the skew orientation of the respective optical axes of front lens assembly 14 and rear lens assembly 16. It is an advantage of this embodiment that the skew angle can be adjusted by rotating rear lens housing 12 about pivot 22.

Turning now to FIG. 4, three representative orientations of lens assemblies are presented. FIG. 4(*a*) depicts a parallel orientation of the optical axes of two lens assemblies. Such orientations are also referred to as "paraxial." While paraxial lens assemblies do not provide a notably larger field of view than that provided by a single lens assembly, the distance between the lens assemblies can provide parallax and therefore depth information. FIG. 4(*b*) depicts reciprocal optical axes. Such a lens arrangement has the advantage of providing the largest possible field of view, but, depending on the particular lens assemblies, has a blind spot near the lens assemblies themselves. For example, in a head-mounted configuration, there may be no coverage of the area immediately behind the user's back. FIG. 4(*c*) depicts skew reciprocal axes. As used herein, skew axes refer to an orientation that is neither parallel nor reciprocal without regard to whether the axes are coplanar. A skew orientation of optical axes can have several advantages, particularly when the angle between the axes is adjustable. For example, in a head-mounted configuration, one lens can be angled to cover the user's back while on foot, and adjusted to cover the view out a side window while driving.

Turning now to FIG. 5, an exemplary method suitable for use with one embodiment of the camera unit is depicted. The method begins at step 500 when the unit powers on. At this point, controller circuitry such as controller circuitry 118 begins receiving data signals from the lens assemblies such as lens assembly 102 and lens assembly 104. This data is combined with any data from supplementary sensors such as sensor 124 and encoded in real time as is known in the art. At step 502, this data is stored in volatile memory 120 until volatile memory 120 is full, at which point writing begins again at the beginning of volatile memory 120, progressively overwriting the oldest data in the manner of a circular buffer. In this manner a continuous recording of all data is maintained for a period of time proportional to the size of volatile memory 120 and inversely proportional to the rate at which encoded data is generated. As a person skilled in the art will appreciate, non-volatile memory may also be used in the place of volatile memory 120.

Next, at step 504, a triggering event is detected. Such triggering event can be any event suggesting that a record of the immediately preceding and/or succeeding events should be retained. A first class of triggering events relates to circumstances around the user. For example, the user triggering the siren and/or light bar of a patrol cruiser might be a triggering event. Alternately, a velocity or acceleration reading, either from the cruiser or from integrated velocity and/or sensors such as sensor 124 may be a triggering event.

For example, a velocity of the user wearing the housing 100 may be a triggering event, such as the user running as opposed to walking. Similarly, a vehicle crash, detected by an accelerometer reading, airbag deployment, or similar stimulus, might be a trigger event. Additionally, a positional reading could be a triggering event. Such a positional reading could be absolute (for example, entering or exiting a particular geo-fenced area) or relative (for example, moving more than a particular distance from a patrol cruiser or other fixed or mobile point of reference).

Such a sensor-related triggering event may be generated directly by the sensor, or by a recording device manager, such as a Digital Ally® VuLink®, that controls and synchronizes various recording devices. For example, the recording device manager may communicate (via wireless communication, wired communication, or both) to sensors such as described herein, one or more person-mounted camera units, a vehicle-mounted video camera oriented to observe events external to the vehicle, a vehicle-mounted video camera oriented to observe events internal to the vehicle, and/or one or more storage storage elements. In some embodiments, the recording device manager detects when one video camera begins recording, and then instructs all other associated devices to begin recording. The recording device manager may also send information indicative of a time stamp to the various recording devices for corroborating the recorded data.

For example, the recording device manager may instruct all associated video cameras to begin recording upon the receipt of a signal from a sensor such as a breath analyzer that a breath analysis has begun. This ensures that multiple video cameras record the breath analysis, for future authentication that the breath analysis was performed correctly. The recording device manager may also send a time stamp to all the associated video cameras to provide a corroboration of the various recorded data.

A second class of triggering events relates to the user. For example, a sensor configured to detect when a holster cover is opened or when a weapon is removed from the holster could generate a triggering event. Another form of user-related triggering event could come in the form of one or more biometric stress indications (such as elevated heart rate, blood pressure respiration, etc.) obtained from biometric sensors worn by the user. Similarly, audio data could generate triggering events if raised voices or high levels of vocal stress are detected.

A third class of triggering events relates to context recognition from the data being collected. For example, when controller circuitry 118 detects that the video data it is processing contains a face, a triggering event could be generated. Alternately, this functionality could be limited to the recognition of a particular face (for example, if the user sees a face matching a photograph provided with a warrant, or on a wanted poster, a trigger event could be generated). Such triggering events can, in some embodiments, be limited to a particular video stream. For example, face detection could only act as a triggering event when the rear camera detects the face; i.e., when a person approaches the user from behind. Similar recognition algorithms can be applied to other data streams as well; for example, the audio signature of a gunshot could be a triggering event, or the positional signature of evasive maneuvering.

Finally, a triggering signal can be generated manually by the user or, in embodiments where data is streamed to a remote date store, by a remote observer. Of course, a person of skill in the art will recognize that a wide variety of triggering signals are possible and variations and combinations of the above will be apparent.

In response to the triggering signal, at step 506, controller circuitry 118 copies the contents of volatile memory 120 to non-volatile memory 122. In this way, a permanent record is created of not merely events following the trigger signal, but of those preceding it was well. This transfer process continues at step 508 as new data is stored to volatile memory 120, in effect recording the live data to non-volatile memory 122 as well. In some embodiments, after a trigger signal is detected, data is recorded directly to the non-volatile memory instead of indirectly via the volatile memory.

Finally, at step 510, the trigger event ends. How this occurs will vary in different embodiments and with different trigger events. In some embodiments, recording to non-volatile memory 122 will continue until the end of shift for the user. In other embodiments, it will continue until non-volatile memory 122 is full. In still other embodiments it will continue until the camera unit is powered down, or until the user manually deactivates it. Additionally, some trigger events can terminate on their own. For example, if the user leaving their patrol car is a trigger event, then returning to the car may end the triggering event, either immediately or after some predetermined delay. Similarly, if elevated biometric readings generate a trigger event, then a return to normal levels may terminate, perhaps with a delay or some level of hysteresis. In some embodiments, the user may be able to manually cancel a trigger event, while in other embodiments this may be undesirable. At this point, processing returns to step 502 to await further trigger signals.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A camera unit comprising:
   a first lens assembly having a first optical axis;
   a second lens assembly having a second optical axis;
   a unitary, tubular lens housing containing both the first lens assembly and the second lens assembly,
   wherein the second lens assembly is rotatably mounted inside the lens housing such that the second optical axis is configured to allow manual rotation about only a single axis of rotation relative to the first optical axis,
   wherein the single axis of rotation is perpendicular to the first optical axis and perpendicular to the second optical axis,
   a mounting clip permanently secured to the lens housing and configured to selectively secure the lens housing to the body of a law-enforcement officer;
   a battery unit;
   a first storage memory;

a second storage memory;
controller circuitry operable to:
    receive video data from the first lens assembly and the second lens assembly and store the video data and a timestamp for synchronizing the video data in the first storage memory; and
a battery housing containing the battery unit and attached via a cable to the lens housing.

2. The camera unit of claim 1, wherein the controller circuitry and first storage memory are located in the battery housing.

3. The camera unit of claim 1, further comprising an attached head-mounted display and wherein the controller circuitry is further operable to display video data on the head-mounted display.

4. The camera unit of claim 1, wherein the controller is further operable to:
    receive a triggering signal; and
    transfer, upon receiving the triggering signal, video data from the first lens assembly and the second lens assembly from the first storage memory to the second storage memory,
    wherein the triggering signal is received in response to a triggering event selected from the set consisting of a siren activation, a light bar activation, an accelerometer reading, a positional reading, a velocity reading, and a vehicle crash event.

5. The camera unit of claim 1, wherein the controller is further operable to:
    receive a triggering signal; and
    transfer, upon receiving the triggering signal, video data from the first lens assembly and the second lens assembly from the first storage memory to the second storage memory,
    wherein the triggering signal is received in response to a triggering event selected from the set consisting of a gunshot detection and a holster event.

6. The camera unit of claim 1, wherein the controller is further operable to:
    receive a triggering signal; and
    transfer, upon receiving the triggering signal, video data from the first lens assembly and the second lens assembly from the first storage memory to the second storage memory,
    wherein the triggering signal is received in response to a triggering event selected from the set consisting of a face detection event and a face recognition event.

7. The camera unit of claim 1, further comprising an RFID tag.

8. The camera unit of claim 1, wherein the lens housing has a miniaturized form factor.

9. The camera unit of claim 1, wherein the second optical axis is configured to allow rotation less than 360 degrees with respect to the first optical axis.

10. The camera unit of claim 9, wherein the angle of the second optical axis with respect to the first optical axis is constrained between 45 degrees and 315 degrees.

11. The camera unit of claim 9, wherein the angle of the second optical axis with respect to the first optical axis is constrained between 90 degrees and 270 degrees.

12. A method of controlling the operation of a camera unit comprising the steps of:
    simultaneously storing imagery from a first lens assembly and a second lens assembly to a first storage memory,
    wherein the second lens assembly is rotatably mounted inside a unitary, tubular lens housing such that the second optical axis is configured to allow manual rotation about only a single axis of rotation relative to the first optical axis,
    wherein the single axis of rotation is perpendicular to the first optical axis and perpendicular to the second optical axis,
    receiving a trigger signal in response to a triggering event;
    transferring the imagery from the first lens assembly and the second lens assembly from the first storage memory to a second storage memory;
    storing a timestamp for synchronizing the imagery in the second storage memory; and
    storing, in response to the trigger signal, said imagery from the first lens assembly and the second lens assembly in the second storage memory.

13. The method of claim 12, wherein the triggering event is selected from the set consisting of a siren activation, a light bar activation, an accelerometer reading, a positional reading, a velocity reading, and a vehicle crash event.

14. The method of claim 12, wherein the triggering event is selected from the set consisting of a gunshot detection event and a holster event.

15. The method of claim 12, wherein the triggering event is selected from the set consisting of a face detection event and a face recognition event.

16. The method of claim 12, further comprising the step of storing an identifier associated with the camera unit with the imagery from the first lens assembly and the second lens assembly.

17. A dual-lens camera apparatus, comprising:
    a unitary, tubular lens housing including a plurality of non-paraxial lens assemblies,
    wherein a first lens assembly and a second lens assembly of the plurality of non-paraxial lens assemblies have non-overlapping fields of view,
    wherein the second lens assembly is rotatably mounted inside the lens housing such that the second optical axis is configured to allow manual rotation about only a single axis of rotation relative to the first optical axis,
    wherein the single axis of rotation is perpendicular to the first optical axis and perpendicular to the second optical axis;
    a mounting clip permanently secured to the lens housing and configured to selectively secure to the body of a law-enforcement officer;
    a battery housing connected by a cable to the lens housing and providing power thereto;
    a volatile memory; and
    a non-volatile memory,
    wherein the non-volatile memory stores video data simultaneously recorded by the first lens assembly and the second lens assembly and a timestamp for synchronizing the video data
    wherein the video data simultaneously recorded by the first lens assembly and the second lens assembly is transferred to and stored in the non-volatile memory upon a triggering signal related to a triggering event.

18. The apparatus of claim 17, wherein the non-volatile memory is located in the battery housing.

19. The apparatus of claim 17, further comprising a head-mounted display operable to display imagery from at least one of the plurality of lens assemblies.

20. The apparatus of claim 17, further comprising a head mount assembly attachable to the lens housing.

21. The apparatus of claim 17, further comprising at least one supplementary sensor providing non-audiovisual data.

\* \* \* \* \*